F. W. ADSIT.
BRAKE.
APPLICATION FILED JUNE 17, 1916.

1,246,831.

Patented Nov. 20, 1917.
2 SHEETS—SHEET 1.

Witnesses:

Inventor
Frank W. Adsit
Foree Bain May
Attys.

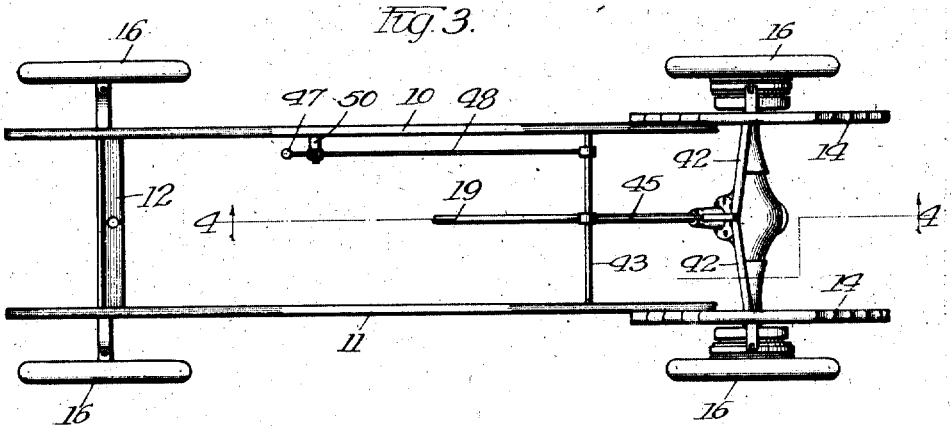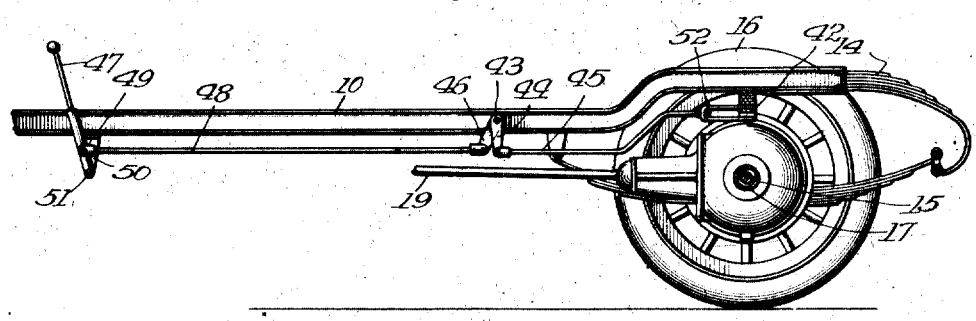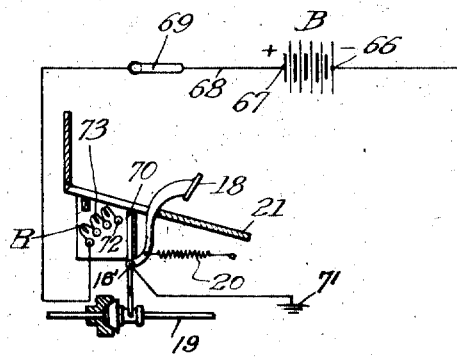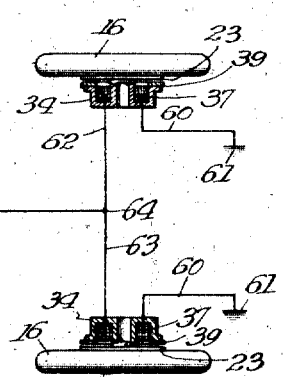

UNITED STATES PATENT OFFICE.

FRANK W. ADSIT, OF CHICAGO, ILLINOIS.

BRAKE.

1,246,831.      Specification of Letters Patent.      Patented Nov. 20, 1917.

Application filed June 17, 1916. Serial No. 104,203.

*To all whom it may concern:*

Be it known that I, FRANK W. ADSIT, a citizen of the United States, residing at Chicago, in the county of Cook and State of Illinois, have invented certain new and useful Improvements in Brakes, of which the following is a specification.

My invention relates to improvements in vehicle brakes and has especial reference to brakes energized by electricity to cause braking association of a non-rotatable member and a relatively rotatable member whereby to stop the rotation of the movable part and to hold it against further rotation.

Another object of my invention is to provide means whereby to disconnect a driving member from a driven member and to thereby automatically cause gradual application of current to an electro-magnetic brake to stop the rotation of the driven member, so constructed and arranged that the brake cannot be energized until after the said driving and driven members have been disconnected.

Another and more specific object of my invention is to mount a brake of this general character, on an automobile, preferably one for each of the traction wheels of the chassis, and to automatically control the current for energizing the brakes by the clutch-controlling lever.

Another object of my invention is to provide an electro-magnetic brake, for an automobile, which may be put in operating condition by energizing it with an electric current and which is independently operable by manual means with the usual foot or hand pedal or lever by application of pressure thereto, said manually operable means being supplemental to and independent of the electro-magnetic means for applying the brake.

Other and further objects of my invention will become readily apparent to persons skilled in the art, from a consideration of the following description when taken in conjunction with the drawings, wherein:—

Fig. 3 is a plan view of the chassis showing my brake applied to the two rear wheels thereof.

Fig. 4 is an enlarged longitudinal section taken on line 4—4 of Fig. 3.

Fig. 5 is a diagram of circuit.

In all the views the same reference characters are employed to indicate similar parts.

Figure 1:
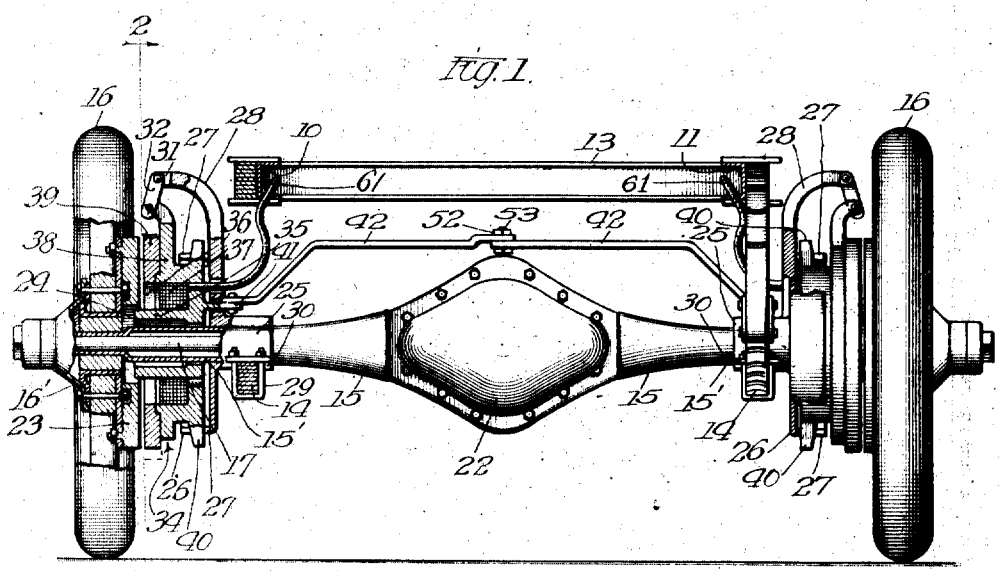
Figure 1 is a rear elevation of an automobile chassis showing parts in section.
Figure 2:
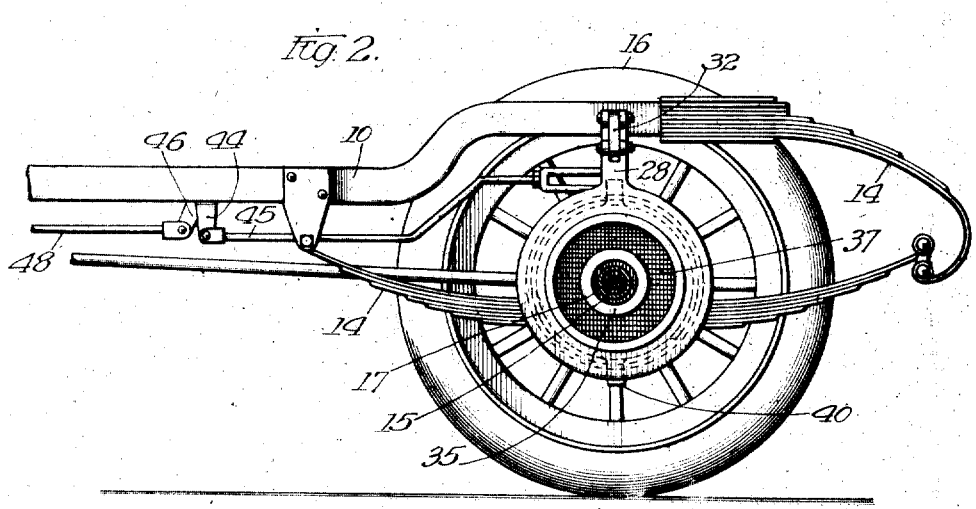
Fig. 2 is a transverse section taken on line 2—2 of Fig. 1.

10 and 11 are the side members of the frame of the chassis, 12 and 13 are the transverse sills or cross members connecting the side members together. 14—14 are the springs connecting the rear axle housing 15 to the frame members 10 and 11, respectively. 16—16 are the traction wheels of the vehicle connected to the respective ends of the rotatable axle 17, which is rotatable within the fixed axle housing 15. 18 is the usual typical foot lever for connecting and disconnecting the clutch members of the usual clutch that is employed to connect the driving engine,—not shown,—with the power shaft 19, as usual in devices of this character. The lever 18 is pivoted, as at 18', and is held in retracted position to normally engage the clutch members, by a spring 20. 21 is the foot board of an automobile. The casing 22 contains the usual differential gear whereby the power shaft 19 is connected to the rotatable axle 17. As so far described the parts are similar to automobiles of conventional type.

Secured to the wheels 16, preferably to the hubs 16' is a renewable ring or plate 23 of magnetic material, such as cast iron, steel or the like, and which is internally bored, as at 24. The fixed axle housing 15 is decreased in diameter as at 15', the extreme further contracted end of which constitutes a bearing for the wheels 16.

Fixed to the axle housing 15, and to the spring 14, is a sleeve 25 enlarged into a cup-shaped part 26, that is provided with a slot in opposite diameters, as at 27, and provided with a vertical, laterally-extending arm 28. Each of the springs 14 is held in contact with the stationary axle housing 15 by a stirrup 29, which engages an extension 30 from the sleeve 25. The end of the arm 28 is slotted, as at 31, for a pivotal link 32 to permit axial movement of the brake member 34. A cup-shaped casting, or brake member 34, having an inner sleeve 35 is freely slidable upon the reduced end 15' of the axle housing 15. The sleeve or hub 35, of the member 34 enters the center bore of the disk 23. Within an annular chamber 36, and which surrounds the hub 35, is an electro-magnetic coil 37, which is surrounded by an annular part 38, of the casting 34. Secured to the part 38 is a renewable wearing plate, or flat ring 39, which is adapted for frictional contact with the wearing plate or flat ring 23 secured to the hub of the wheel 16, when the slidable brake member or casting 34 is bodily moved along the axle housing 15. Projecting radially from the part 34 are diametrically disposed lugs 40 within the notches 27 of the non-rotatable part 26. These lugs engage the part 26, which is fixed to the axle housing 15, and prevents the part 34 from rotating. When the coil 37 is energized, by a proper current of electricity, the magnetic circuit produced by the coil is completed through the hub or sleeve 35, which enters the aperture 24 and is in close approximation to the inner surface of the plate 23 bounding the aperture 24, and through the wearing plates 23 and 39 and through the annular plate 38, thus drawing the part 34 up toward the wheel 16 so that the wearing plates 23 and 39 will make actual contact producing friction between the plates 23 and 39 sufficient to stop rotation of the wheel 16.

Projecting laterally from the brake member 34, and through an aperture in the part 26, is an arm 41 to which is connected a link 42 which with another similar link connected to a similar part associated with the opposite wheel constitutes a toggle, whereby the plates 23 and 39 may be mechanically and forcibly pushed into actual contact to manually apply the brake.

A transverse shaft 43 has bearings in the side members 10 and 11 of the frame and carries an arm 44 that is connected by a rod 45 with the two ends of the members 42. Connected to the shaft 43 is another arm 46 which in turn is connected to a hand, or foot-operated lever 47, by a rod 48, as at 49. The lever 47 is pivoted to a stationary part 50, as at 51. When the lever 47 is pulled rearwardly motion is transmitted through the rods 45 and 48 to the toggle members 42—42 which are thereby straightened out into substantially a common transverse plane thus causing movement of the brake members 34, on the axle housing 15, until the wearing plates or rings 23 and 39 make frictional contact, one with the other, thus applying the brake equally on both wheels, attached to a common axle housing. The rod 45 is provided, on its rear end, with a strap 52 through which a bolt or rivet 53 passes and which also passes through the approximate ends of the toggle members 42.

Now referring to Fig. 5, the two coils 37 are connected in parallel, one end of which, 60, is grounded to the frame, as at 61, the other ends 62 and 63 being connected together, as at 64, and by a wire 65, to the battery B, as at 66. The other terminal 67 of the battery is connected to a rheostat R by a wire 68. A hand operated controlling switch 69 is located in this part of the circuit for the purpose of opening the brake circuit when desired.

The clutch operating lever 18 carries an arm 70 which is grounded to the frame, as at 71.

The clutch-controlling lever 18 is shown in position, in Fig. 5, in which it is placed by the actuating spring 20 when the engine is connected to the shaft 19. When the lever 18 is pushed forward, by application of pressure by the foot of the operator to disconnect the clutch, the arm 70 is thereafter brought into contact with the first button 72 of the rheostat R to energize the electric brake member. Further movement of the lever 18, and thereby the arm 71, over the contact buttons 72 cuts out the resistance coils 73, one after another, thus increasing the current that will flow through the brake coils 37 thereby gradually increasing the magnetic attraction between the wearing plate 23, secured to the wheel 16, and the wearing plate 39 secured to the axially movable member 34, thus avoiding too sudden application of the brake to the vehicle.

When the foot lever 18 is released, the circuit is just as gradually opened by the inclusion of the resistance coils 73, one after another, thereby reducing the current before opening the circuit, after which the clutch members, for connecting the engine to the running gear of the vehicle are placed in operative connection.

A switch 69, for opening the brake circuit may be employed, when it is not desirable to apply the electric brake. When the brake has been "set" by the electric action referred to, the frictional engagement of the parts may be further increased by the application of the toggle joint, consisting of the members 42—42, by movement of the hand lever 47, or if it is desirable to use the mechanical brake alone it may be operated quite independently of the electrical brake, in a manner plainly obvious.

Having described my invention, what I claim is:—

1. An automobile brake comprising a magnetically susceptible member carried by a wheel of the chassis; a relatively non-rotatable member, said members axially movable with respect to each other; electric means to magnetically energize said brake members, to bring them into frictional engagement, and a supplementary mechanical means to effect frictional engagement between said brake members independently of the magnetic means.

2. In combination with the clutch-operating lever of an automobile chassis, of an electro-magnetic brake comprising a brake member of magnetically susceptible material carried by a wheel of the chassis; a relatively non-rotatable brake member, of similar material, for operative association with the first mentioned member; electric means, controllable by said clutch-operating lever to magnetically energize said brake members.

3. In combination with the clutch-operating lever of an automobile, of an electromagnetic brake comprising a brake member of magnetically susceptible material carried by a wheel of the chassis; a relatively non-rotatable brake member, of similar material, for frictional engagement with the first mentioned member; electric means for energizing said brake members; a rheostat for inclusion in circuit with said energizable brake member, controllable by said clutch-operating lever after said clutch members are separated thereby.

4. In combination with an automobile chassis; a brake member of magnetically susceptible material connected, one each to opposite wheels of a pair of wheels of a chassis; an axially-movable, magnetically-susceptible, non-rotatable member for braking association with each wheel member; a source of electric current to magnetically energize said members to cause braking action therebetween and mechanical means for forcing said braking members into mutual contact to stop rotation of said wheel.

5. In combination with an automobile chassis; a brake member of magnetically-susceptible material connected, one each to opposite wheels of a pair of wheels of the chassis; an axially-movable magnetically-susceptible non-rotatable member for braking association with each wheel member; a source of electric current to magnetically energize said members to cause braking action therebetween; a toggle connection between the axially movable members to force them outwardly into contact with the respective wheel members when the toggle is straightened and a manually operable lever for controlling said toggle.

6. In combination with an automobile chassis; a brake member of magnetically susceptible material connected, one each to opposite wheels of a pair of wheels of the chassis; an axially-movable magnetically-susceptible non-rotatable member for frictional engagement with each said wheel member; a source of electric current to magnetically energize said members to bring them into frictional contact engagement and manually-operable means to independently move said members into frictional engagement or to supplement the action of said magnetic means.

In testimony whereof I hereunto set my hand in the presence of two subscribing witnesses.

FRANK W. ADSIT.

In the presence of—
  STANLEY W. COOK,
  MARY F. ALLEN.